United States Patent [19]

Paasikivi

[11] 4,088,153
[45] May 9, 1978

[54] SINGLE-HANDLED MIXING VALVE

[75] Inventor: Erkki Jalmari Paasikivi, Rauma, Finland

[73] Assignee: K. Oras OY, Rauma, Finland

[21] Appl. No.: 663,702

[22] Filed: Mar. 4, 1976

[30] Foreign Application Priority Data

Mar. 6, 1975 Finland .................................. 750655

[51] Int. Cl.² .......................................... F16K 19/00
[52] U.S. Cl. .............................. 137/625.17; 137/625.4
[58] Field of Search ............. 137/625.17, 625.4, 636.3; 251/368

[56] References Cited

U.S. PATENT DOCUMENTS

| 3,433,264 | 3/1969 | Parkison | 137/625.17 |
| 3,533,436 | 10/1970 | Parkison | 137/359 |
| 3,533,444 | 10/1970 | Lyon | 137/625.17 |
| 3,661,180 | 5/1972 | Lyon | 137/625.17 |
| 3,965,936 | 6/1976 | Lyon | 137/625.4 |

Primary Examiner—Arnold Rosenthal
Attorney, Agent, or Firm—Oblon, Fisher, Spivak, McClelland & Maier

[57] ABSTRACT

A mixing valve controlled with one operating lever and comprising a first fixed ceramic plate with inlet openings communicating with inlet pipes for cold and hot water respectively and with a discharge opening for the controlled water amount; and a second ceramic plate cooperating with said first ceramic plate and being movable by means of said operating lever in order to control the total amount and the mixing ratio of cold and hot water; said mixing valve further comprising a fixed channel member, which is attached to and movable with the second ceramic plate, said channel member and said second ceramic plate forming together separate non-communicating channels for cold and hot water respectively, so that the cold and hot water are not intermixed until reaching the discharge opening. Preferably, the channel member is of plastic material and sealed in relation to the second ceramic plate by means of a sealing ring surrounding the separate channel parts.

1 Claim, 2 Drawing Figures

SINGLE-HANDLED MIXING VALVE

BACKGROUND OF THE INVENTION

1. Field of the Invention

The present invention relates to a mixing valve controlled with one lever, a valve in which the total quantity and mixing ratio of cold and hot water are regulated by means of one lever and the inlets for cold and hot water are formed by two ceramic plates of which one is fixed to the valve body and the other is movable by means of the lever.

2. Description of the Prior Art

Valves of this type have been described in, for example, U.S. Pat. Nos. 3,661,180 and 3,533,436. In these valves there is on top of the ceramic plate a plastic part which protects the ceramic valve plate from wear and is held in place by the pressure of the spherical part of the control lever. The plastic part also serves as a slide plate when the valve is regulated. The plate is not sealed and does not form water channels.

Furthermore, from U.S. Pat. No. 3,384,119 a mixing valve is known having parallel through-flow openings for cold and hot water in the valve piece movable against the valve seat. This valve, however, deviates from the former ones in that two ceramic plates are not used. The flow channels end in the side edge of the valve piece and are situated asymmetrically in relation to the fixed discharge opening therebelow, except when the mixing ratio is 1:1. This is one disadvantage when considering the operation of the valve.

Valve structures using two ceramic plates have also been introduced in U.S. Pat. Nos. 3,476,149 and 3,433,264 and in the published German Patent Application 2 230 174.

A ceramic valve construction has an advantage in that the plates can be clapped together tightly so that no rubber gasket or other seal is necessary. This results in that the life of the valve is very long and its need for maintenance very small.

SUMMARY OF THE INVENTION

The present invention provides a mixing valve structure of the character once described, which comprises a valve body, inlet pipes for cold and hot respectively, a first fixed ceramic plate having inlet openings connected to said inlet pipes and a water discharge opening for the controlled water amount, a second movable ceramic plate positioned in flat relationship to said first fixed ceramic plate and movable in relation thereto, a channel member sealingly and rigidly fixed to said second ceramic plate and forming together with the second ceramic plate non-communicating channels for cold and hot water so that the cold and hot water are not mixed with each other before reaching the discharge opening in the first fixed ceramic plate, and an operating lever pivotally connected to said channel member for movement of the channel member together with the second ceramic plate in order to control the total amount and the mixing ratio of cold and hot water.

The object of the present invention is to improve the valve construction of the type described in the patents cited above in order to obtain a construction which is less expensive to manufacture and more reliable than those according to the said patents and has better operation characteristics than the valves according to the said patents.

In one specific embodiment of the invention the movable piece or channel member attached to the second ceramic plate comprises two channels curving towards each other symmetrically and being closest to each other at a point adjacent the corresponding discharge opening in the fixed ceramic plate.

The invention and its other features and advantages are described below in more detail in the form of an example, with reference to the enclosed drawings.

DESCRIPTION OF THE PREFERRED EMBODIMENT

Figure 1:
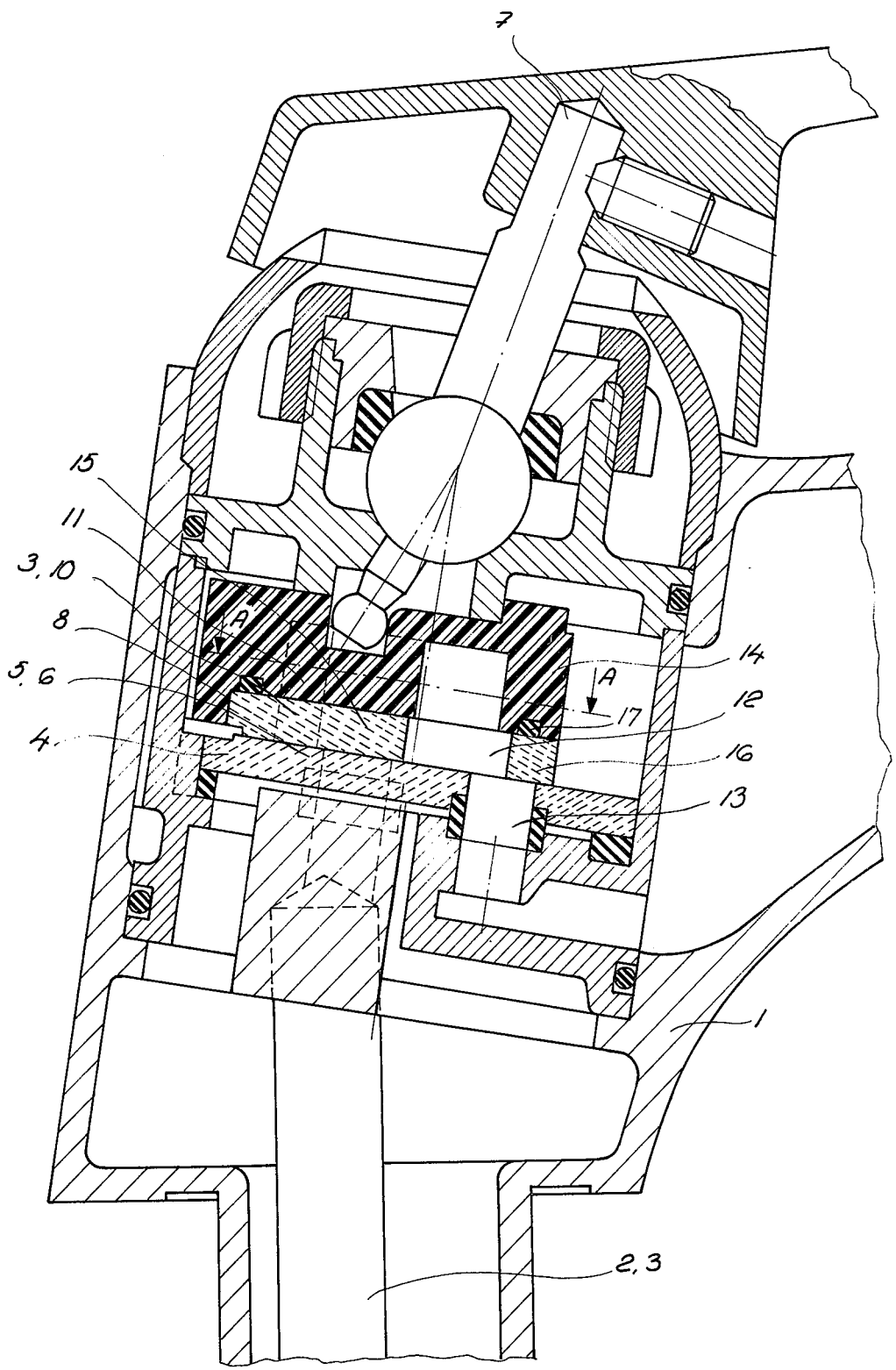
FIG. 1 shows a cross section of one embodiment of the mixing valve according to the invention.

The construction of the mixing valve is shown in FIG.1. The body of the mixer is indicated by 1, and cold and hot water enter through the pipes 2 and 3. A first fixed ceramic plate is indicated by 4 and the inlet waters discharge through the fixed ceramic plate through the openings 5 and 6 connected to the pipes 2 and 3. The device is operated by means of a lever 7, which moves an upper second ceramic plate 8 fixed to a plastic piece or channel member 14. The upper ceramic plate has openings 9 and 10, through which the water discharges into the channels 11 in the plastic piece 14. The channel member 14 is sealed in relation to the movable ceramic plate by means of a sealing ring 17.

Figure 2:
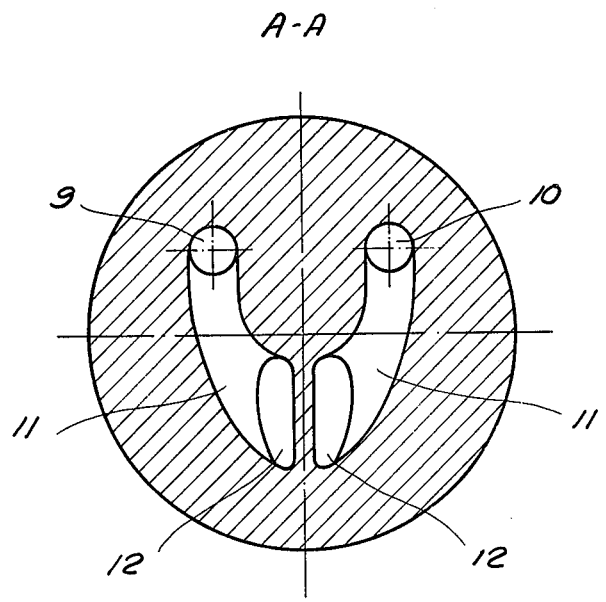
FIG. 2 shows a cross section taken along line A—A of FIG. 1.

The opening 12 is divided into two parts by a partition so that cold and hot water flow through separate channels in the channels 11 and are not mixed until the opening 13 in the fixed ceramic plate 4. The construction of the channel system is shown in FIG. 2. As seen in the cross section of the plastic piece or channel member, the curved channel parts 11 approach each other and widen towards the discharge opening.

The advantage of the present invention in comparison with the previously mentioned patents is specifically that the movable ceramic plate can be made to move in a different direction and way than in the inventions suggested previously, i.e., the closing is performed by means of a transverse isthmus 15, whereas in all the other inventions cited it is performed by means of the plate edge 16. As a result, the constructions of the inlet pipes and the body are simplified; partitions and inconvenient directions of movement are eliminated. An essential advantage of this invention is that the cold and hot water are not mixed until they reach the discharge opening 13, in which care the flow directions of cold and hot water are parallel and no turbulence and consequent noise is produced. This type of construction, in which the pressure of the inlet waters extends to the space above the ceramic closing plates, has an additional advantage in that the pressure force which pushes the fixed and the movable ceramic plates apart is small. This makes a light operating movement possible. The construction has a further advantage in that the possibility that the flows of cold and hot water could cross is almost non-existent since mixing of the water takes place far from the control openings 5 and 6.

What is claimed is:

1. A single-handled mixing valve, which comprises a valve body;
inlet pipes for cold and hot water respectively;

a first fixed ceramic plate having inlet openings connected to said inlet pipes an a water discharge opening for the controlled water amount;

a second movable ceramic plate positioned in flat relationship to said first fixed ceramic plate and movable in relation thereto;

a channel member sealingly and rigidly fixed to said second ceramic plate and forming together with the second ceramic plate non-communicating channels for cold and hot water so that the cold and hot water are not mixed with each other before reaching the discharge opening in the first fixed plate; and an operating lever pivotally connected to said channel member for movement of the channel member together with the second ceramic plate in order to control the total amount and the mixing ratio of cold and hot water;

said non-communicating channels, as seen in the crosssection of the channel member, comprising two channels which curve towards each other symmetrically and are closest to each other at a point adjacent to the discharge opening of the fixed ceramic plate;

the movable ceramic plate comprising two inlets which correspond to the inlets in the fixed ceramic plate and two discharge openings situated close to each other, separated by a narrow isthmus, which are symmetrically disposed in regard to the discharge opening in the fixed ceramic plate;

the channel member attached to the movable ceramic plate being of plastic material and being sealed in relation to said movable ceramic plate by means of a sealing ring surrounding the said channel parts.

* * * * *